Jan. 20, 1925.
J. G. COUSAR ET AL
1,523,633
GATHERING DEVICE
Filed July 10, 1922
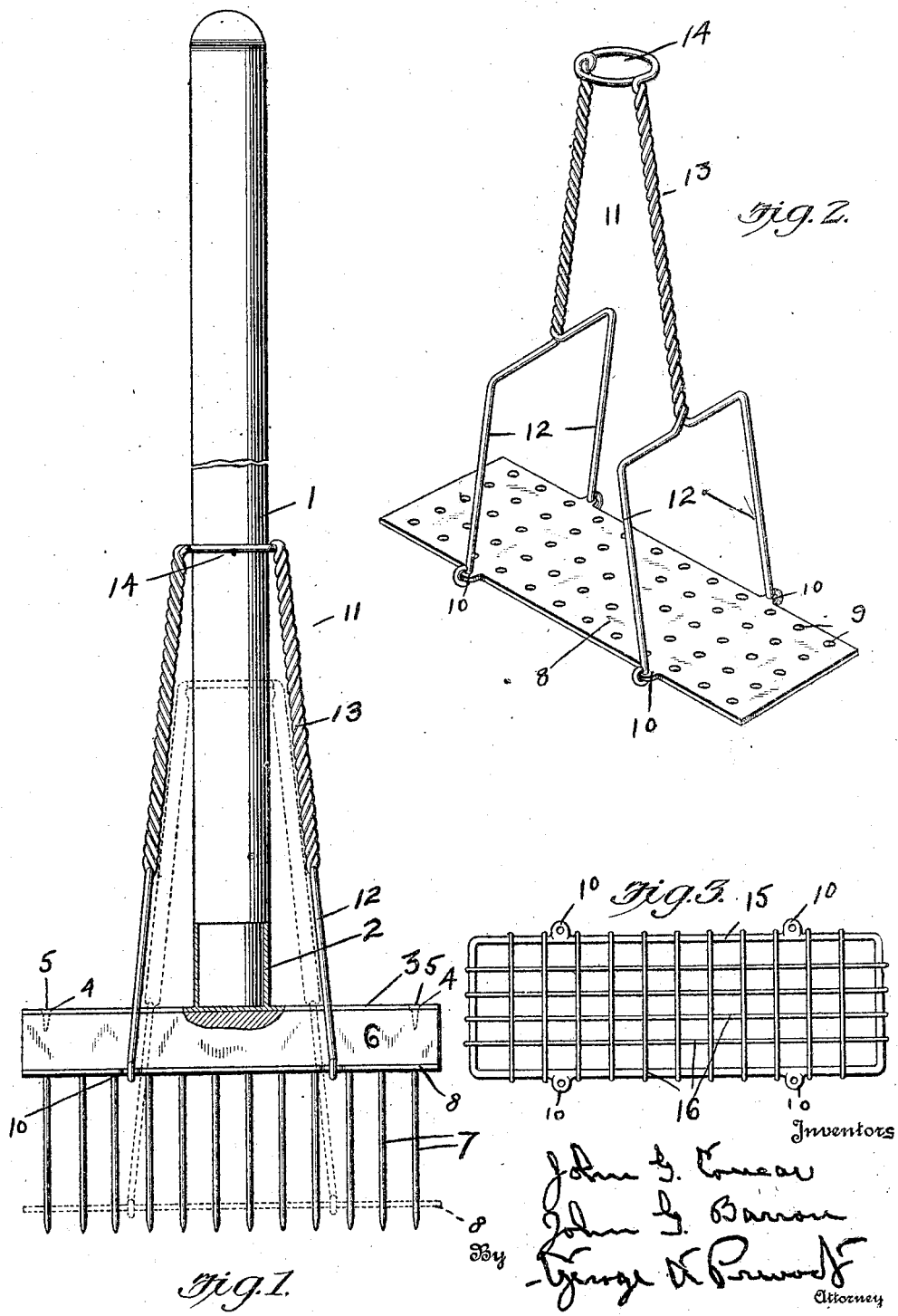

Patented Jan. 20, 1925.

1,523,633

UNITED STATES PATENT OFFICE.

JOHN G. COUSAR AND JOHN G. BARRON, OF FORT LAWN, SOUTH CAROLINA.

GATHERING DEVICE.

Application filed July 10, 1922. Serial No. 574,047.

*To all whom it may concern:*

Be it known, that we, JOHN G. COUSAR and JOHN G. BARRON, citizens of the United States, residing at Fort Lawn, in the county of Chester and State of South Carolina, have invented certain new and useful Improvements in Gathering Devices; and we do hereby declare the following to be a full, clear, and exact description of the invention, such as will enable others skilled in the art to which it appertains to make and use the same.

Our invention consists of certain new and useful improvements in gathering devices, and more particularly that class of device used for gathering cotton bolls or squares when infested by insects, its object being to provide a device of this class in the simplest and cheapest way possible, yet which is just as effective in use as the more complicated and expensive ones.

It is well known to those skilled in the art, that one of the great hindrances to cotton growers, is the boll weevil, which has lately infested the southern part of this country, and is steadily expanding its territory of destruction, and seriously threatens the cotton growing industry.

This small insect infests the cotton plant, puncturing and laying its eggs in the squares and bolls, which kills them and causes them to fall to the ground.

If the bolls and squares are allowed to remain on the ground undestroyed, the eggs will hatch and the weevil will spread and destroy the whole crop.

To avoid this, we provide a device with which one can gather the squares of cotton containing the eggs, from the ground, without having to stoop over and pick them up by hand, a very tiresome procedure.

Another object of our invention is to provide a means for discharging the cotton squares from the gathering device into the bag or the like carried by the operator.

With the above and other objects in view which will appear as the description proceeds, the invention consists in the novel features herein set forth, illustrated in the accompanying drawings and more particularly pointed out in the appended claim.

In the drawings, numerals of like character, designate similar parts throughout the several views.

Fig. 1 is a side elevation of our device showing in dotted lines the position of the plate when discharging the mass of squares and bolls.

Fig. 2 is a detail view of the discharging means, and

Fig. 3 is a modification of the same.

1 designates a handle, the lower end of which is reduced and fits into a ferrule 2 which may be integral with a plate 3 or secured thereto in any desired manner. This plate 3 is provided with apertures 4 in each end, which are adapted to receive screws. By means of screws 5, we secure a base portion 6 to the plate 3 which base portion is preferably rectangular in shape, and is provided with a plurality of spikes 7 which are sharpened at their free ends.

8 represents a plate provided with perforations 9, adapted to register with the spikes 7, the plate being slidably mounted thereon. The sides of the plate 8 are provided with perforated ears 10, integral therewith and adapted to receive the ends of the frame 11, which comprise wires 12 extending upwardly for a distance substantially equal to the length of the spikes 7 and base 6, and are then bent inwardly at approximately right angles, after which they are wound upon themselves as at 13, to form a gripping means, leaving a loop 14 to receive the handle 1, upon which the frame is slidably mounted.

In Fig. 3, we have shown a modified form of the discharging plate 8 which comprises a horizontally disposed wire frame 15 having ears 10, as in Fig. 2, but instead of the plate and perforations, is provided with wires 16, which cross one another and form openings through which the spikes 7 pass, and which serve to discharge the cotton squares.

The operation of our device is obvious. The operator grasps the handle 1 and forces the spikes 7 into the squares of cotton, on the ground, the plate 8 being in the position shown in dotted lines, Fig. 1. As bolls and squares are accumulated on the spikes, the plate gradually works up to the base portion 6 until there is no more room for more. With his other hand, he then grasps the frame 11 at 13, and slides the plate downwardly on the spikes 7 forcing anything thereon off into his bag or basket. The spikes being cleared, he repeats the operation.

It is believed the fact of the plate 8 working upward from the free ends of the spikes to the base 6 is a distinctive feature and has the advantage of preventing spikes from being injured or bent in coming in contact with rock or other hard substances, and of preventing spikes from becoming clogged with mud in wet weather.

From the foregoing, it is believed that the invention may be clearly understood without further description, and it is understood that it is not restricted to the exact details as set forth, since they may be modified within the scope of the appended claim, without departing from the spirit of our invention.

What we claim and desire to secure by Letters Patent is:—

A gathering device comprising a main body and a handle secured thereto, a plurality of spikes secured in said main body having their outer ends free, a wire frame having a plurality of wires crossed thereon, said wires engaging said spikes and being slidably mounted thereon, laterally extending ears on said frame, means for actuating said frame comprising two wires the ends of which are secured to said ears, said wires extending upwardly for a distance, then being bent inwardly and wound upon each other, leaving a loop adapted to slide on the handle.

In testimony whereof we affix our signatures.

JOHN G. BARRON.
JOHN G. COUSAR.